US010525502B2

(12) United States Patent
Claridge et al.

(10) Patent No.: US 10,525,502 B2
(45) Date of Patent: Jan. 7, 2020

(54) METHODS OF NANOSCALE DIRECTIONAL WETTING AND USES THEREOF

(71) Applicant: Purdue Research Foundation, West Lafayette, IN (US)

(72) Inventors: Shelley A Claridge, Lafayette, IN (US); Shi Wah Choong, West Lafayette, IN (US); Jae Jin Bang, West Lafayette, IN (US); Shane Richard Russell, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/875,025

(22) Filed: Jan. 19, 2018

(65) Prior Publication Data

US 2018/0229265 A1  Aug. 16, 2018

Related U.S. Application Data

(60) Provisional application No. 62/449,138, filed on Jan. 23, 2017.

(51) Int. Cl.
*B05D 5/04* (2006.01)
*B05D 1/18* (2006.01)
(Continued)

(52) U.S. Cl.
CPC ............... *B05D 5/04* (2013.01); *B05D 1/18* (2013.01); *B05D 1/204* (2013.01); *B05D 5/06* (2013.01);
(Continued)

(58) Field of Classification Search
CPC ............. B05D 5/04; B05D 1/18; B05D 5/06
See application file for complete search history.

(56) References Cited

U.S. PATENT DOCUMENTS

2014/0158287 A1* 6/2014 Takeoka ............... C08J 5/18
156/155
2016/0347865 A1* 12/2016 Shah ................. C07K 17/08

FOREIGN PATENT DOCUMENTS

WO  WO-2014184383 A1 * 11/2014

OTHER PUBLICATIONS

Yan Yang and Matthew B. Zimmt. Shape Amphiphiles in 2-D: Assembly of 1-D Stripes and Control of Their Surface Density. The Journal of Physical Chemistry B. 119. 7740-7748. (Year: 2015).*

(Continued)

*Primary Examiner* — Dah-Wei D. Yuan
*Assistant Examiner* — Kristen A Dagenais-Englehart
(74) *Attorney, Agent, or Firm* — Purdue Research Foundation; Liang Zeng Yan

(57) ABSTRACT

This invention discloses a method for controlling nanoscopic wetting near or at a molecular scale for synthetic material applications. In particular this invention relates to a method for preparing a monolayer or thin film with a patterned nanoscopic wetting surface using a 'sitting' phase of polymerizable amphiphile, wherein hydrophobic alkyl chains of the amphiphile extend along the supporting surface and the amphiphile molecules align side-to-side, effectively forming a repeating cross-section of bilayer with alternating hydrophilic and hydrophobic stripes of a ~6 nm pitch tunable based on the chain length of the amphiphile. Products prepared according to the methods disclosed herein are within the scope of this invention. In some embodiments, monolayers or thin films so prepared are transferable.

16 Claims, 10 Drawing Sheets

(51) Int. Cl.
- B05D 5/06 (2006.01)
- C09D 139/00 (2006.01)
- B05D 1/20 (2006.01)
- B05D 5/08 (2006.01)
- B05D 7/24 (2006.01)
- B05D 1/04 (2006.01)
- B82Y 40/00 (2011.01)
- B82Y 30/00 (2011.01)

(52) U.S. Cl.
CPC ............... B05D 5/08 (2013.01); B05D 7/24 (2013.01); C09D 139/00 (2013.01); B05D 1/04 (2013.01); B82Y 30/00 (2013.01); B82Y 40/00 (2013.01); C03C 2217/75 (2013.01)

(56) References Cited

OTHER PUBLICATIONS

Deying Xia, Leah M. Johnson, and Gabriel P. Lopez. Advanced Materials. 24. 1287-1302 (Year: 2012).*
MacLeod, J.M., et al., Molecular Self-Assembly on Graphene. 2014, 10, No. 6, 1038-1049.
Mann J.A., et al., Noncovalent Functionalization of Graphene by Molecular and Polymeric Adsorbates. J. Phys. Chem. Lett. 2013, 4, 2649-2657.
Claridge, S.A., From the bottom up: dimensional control and characterization in molecular monolayers. Chem. Soc. Rev., 2013, 42, 2725-2745.
Yi, Y., et al., Janus particles for biological imaging and sensing. Analyst, 2016, 141, 3526-3539.
Tahara, K., et al., Functionalized Surface-Confined Pores: Guest Binding Directed by Lateral Noncovalent Interaction at the Solid Liquid Interface. ACS Nano, 2014, vol. 8, 8683-8694.
Cui, D., et al., Solution and air stable host/guest architectures from a single layer covalent organic framework. Chem. Commun., 2015, 51, 16510-16513.
Bang, J.J., et al., Sitting Phases of Polymerizable Amphiphiles for Controlled Functionalization of Layered Materials. J. Am. Chem. Soc. 2016, 138, 4448-4457.
Bain, C.D., et al., A Study by Contact Angle of the Acid-Base Behavior of Monolayers Containing o-ercaptocarboxylic Acids Adsorbed on Gold: An Example of Reactive Spreading. Langmuir 1989,5, 1370-1378.
Nbocquet, L., et al., Nanofluidics, from bulk to interfaces. Chem. Soc. Rev., 2010, 39, 1073-1095.
Wihelm, O., et al., Electrospray evaporation and deposition. J. Aerosol Science 2003, 34, 815-836.
Drelich, J., et al., The Effect of drop size on contact angel over a wide range of drop volumes. J. Colloid & Interface Science 1993, 155, 379-385.
Hu, H., et al., Molecular dynamics simulations of disjoining pressure effect in ultra-thin water film on a metal surface. Appl. Phys. Lett. 103, 263110 (2013).
Kimmel, G.A., et al., No Confinement Needed: Observation of a Metastable Hydrophobic Wetting Two-Layer Ice on Graphene. J. Am. Chem. Soc. 2009, 131, 12838-12844.
Algara-Siller, G., et al., Square ice in graphene nanocapillaries. Nature 2015, 519, 443-445.
Lee, T.R., et al., The Wetting of Monolayer Films Exposing Ionizable Acids and Bases. Langmuir 1994, 10, 741-749.
Peng, Z., et al., Bottom-up Nanofabrication Using DNA Nanostructures. Chem. Mater. 2016, 28, 1012-1021.
Claridge, S.A., et al., Differentiating Amino Acid Residues and Side Chain Orientations in Peptides Using Scanning Tunneling Microscopy. J. Am. Chem. Soc. 2013, 135, 18528-18535.
Okawa, Y. et al., Controlled chain polymerisation and chemical soldering for single-molecule electronics. Nanoscale 2012, 4, 3013-3028.
Xia, D., et al., Anisotropic Wetting Surfaces with One-Dimesional and Directional Structures: Fabrication Approaches, Wetting Properties and Potential Applications. Adv. Mater. 2012, 24, 1287-1302.
Drelich, J., et al., Contact Angles for Liquid Drops at a Model Heterogeneous Surface Consisting of Alternating and Parallel Hydrophobic/Hydrophilic Strips. Langmuir 1996, 12, 1913-1922.
Bliznyuk, O., et al., Scaling of anisotropic droplet shapes on chemically stripe-patterned surfaces. Physical Review E 2009, 79, 041601.
Jansen, H.P., et al., Shape of Picoliter Droplets on Chemically Striped Patterned Substrates. Langmuir 2014, 30, 11574-11581.
Karas, M., et al., Nano-electrospray ionization mass spectrometry: addressing analytical problems beyond routine. Fresenius J Anal Chem (2000) 366 :669-676.
Juraschek, R., et al., Nanoelectrospray—More than just a minimized-flow electrospray ionization source. J. Am. Soc. Mass. Spectrom. 1999, 10, 300-308.
Josserand, C., et al., Drop Impact on a Solid Surface. Annu. Rev. Fluid Mech. 2016, 48:365-391.
Russell, S.R., et al., Peptide interfaces with graphene: an emerging intersection of analytical chemistry, theory, and materials. Anal Bioanal Chem (2016) 408:2649-2658.
Oron, A. et al., Long-scale evolution of thin liquid films. Reviews of Modern Physics, 1997, vol. 69, No. 3, 931-956.

\* cited by examiner

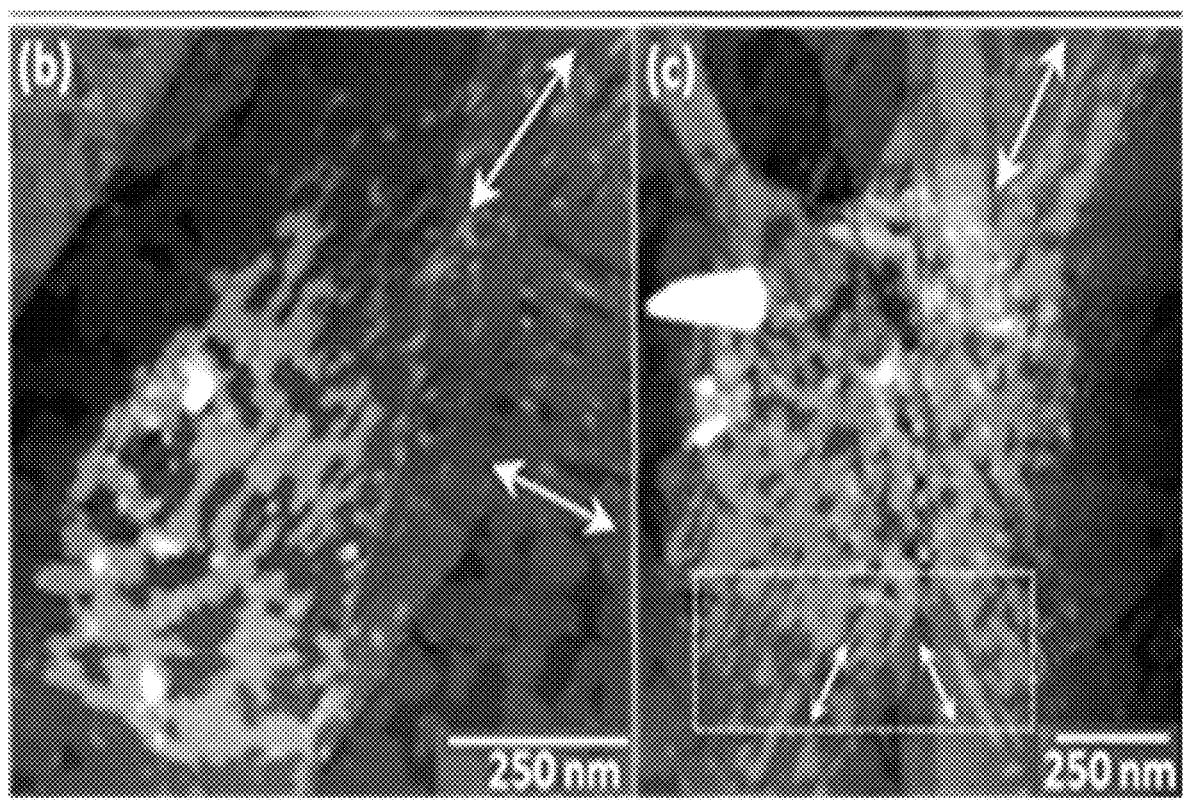
FIG. 7B
FIG. 7C
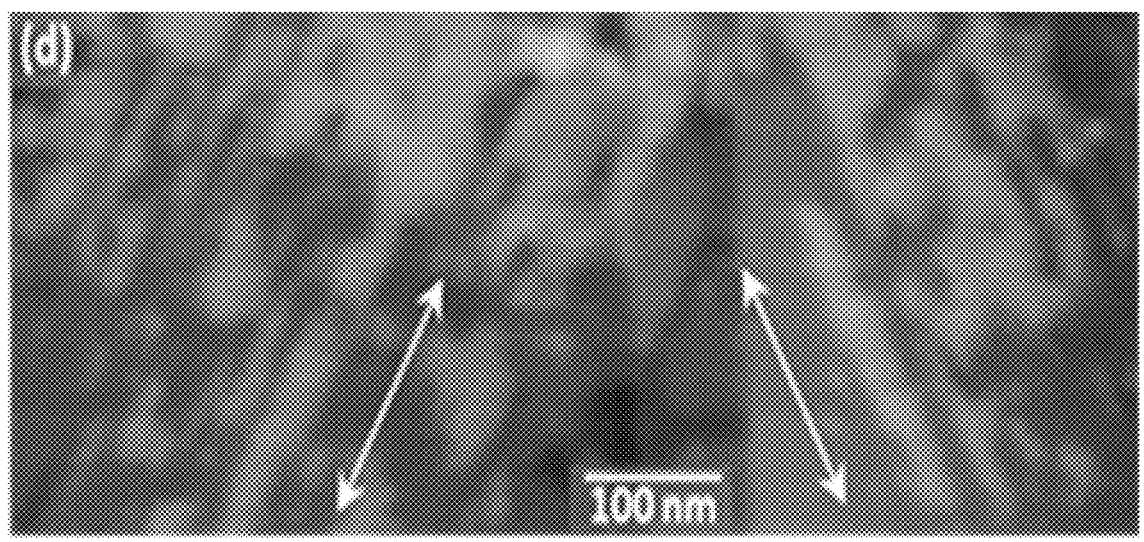
FIG. 7D

METHODS OF NANOSCALE DIRECTIONAL WETTING AND USES THEREOF

CROSS-REFERENCE TO RELATED APPLICATIONS

The present U.S. patent application relates to and claims the priority benefit of U.S. Provisional Patent Application Ser. No. 62/449,138, filed Jan. 23, 2017, the contents of which are hereby incorporated by reference in their entirety.

GOVERNMENT SUPPORT CLAUSE

This invention was made with government support under grant NSF-CHE 1555173 awarded by the National Science Foundation. The government has certain rights in the invention.

TECHNICAL FIELD

This invention generally relates to a method for controlling nanoscopic wetting of a surface near or at a molecular scale for synthetic material applications. In particular this invention relates to a method for preparing a monolayer or a thin film with a surface of patterned nanoscopic wetting manufactured by using a 'sitting' phase of polymerizable amphiphile.

BACKGROUND

This section introduces aspects that may help facilitate a better understanding of the disclosure. Accordingly, these statements are to be read in this light and are not to be understood as admissions about what is or is not prior art.

Due to the widespread interest in modulating graphene electronic properties, significant efforts have been directed toward ordering noncovalent ligand layers to control molecule-substrate interactions (MacLeod, J. M. et al., *Small* 2014, 10, 1038-1049; Mann, J. A. et al., *J. Phys. Chem. Lett.* 2013, 4, 2649-2657; Claridge, S. A., et al., *Chem. Soc. Rev.* 2013, 42, 2725-2745). However, ordering ligand to promote specific, spatially-resolved interactions with the environment (e.g. electrodes, optoelectronic active layers, analytes) is also a problem of growing importance for precisely registered integration into a functional device. Fundamentally, this requires spatial orientation information to be encoded in the ligand layer by displaying two or more different (e.g. wetting-orthogonal) surface chemistries in a controlled way. Related ligand chemistries have been developed for colloidal inorganic nanocrystals (e.g. construction of Janus particles), and have been a powerful enabler for oriented assembly of particles at interfaces including cell membranes and in solution-processed devices (Yi, Y. et al., *Analyst* 2016, 141, 3526-3539).

In principle, lying-down phases frequently used for non-covalent functionalization could represent a convenient means of presenting alternating stripes of orthogonal surface chemistries at very short length scales (<10 nm). Such a capability would be useful for structuring interfacial wetting (FIG. 1) for electronic, optoelectronic, sensing, and nano-fluidic applications, in which feature sizes in that size regime are desirable, and are difficult to achieve via other interfacial patterning strategies (e.g. soft lithography) (Claridge, et al., 2013).

However, two key challenges arise in utilizing lying-down phases to pattern interfaces in this way. First, the noncovalent molecule-substrate interface in lying-down monolayers is not intrinsically robust toward removal or replacement of solvent, a frequent requirement for device fabrication or other sample processing (MacLeod, et al., 2014). This problem has begun to be addressed through strategies such as in situ polymerization of the ligand layer (e.g. topochemical photopolymerization of diynes) (Tahara, K., et al., *ACS Nano* 2014, 8, 8683-8694; Cui, D., et al., *Chem. Comm.* 2015, 51, 16510-3). Second, and less widely examined, are the challenges that arise in directing local wetting utilizing functional patterns that modulate interface dielectric near or at the molecular scale, particularly when using polar solvent on a nonpolar layered material interface (Bang, J. J., et al., *J. Am. Chem. Soc.* 2016, 138, 4448-4457). These challenges relate to both the behavior of functional groups in dimensionally confined high-dielectric/low-dielectric environments, and the behavior of liquids confined near an interface (Bain, C. D., et al., *Langmuir* 1989, 5, 1370-1378). The invention disclosed herein may provide a practical solution to those challenges.

BRIEF SUMMARY OF INVENTIONS

This invention discloses a method for controlling nanoscopic wetting near or at the molecular scale for synthetic material applications. In particular this invention relates to a method for preparing a monolayer or thin film with a patterned nanoscopic wetting surface manufactured using a 'sitting' phase of polymerizable amphiphile, wherein hydrophobic alkyl chains of the amphiphile extend along the supporting surface and the amphiphile molecules align side-to-side, effectively forming a repeating cross-section of bilayer with alternating hydrophilic and hydrophobic stripes of an about 6 nm pitch tunable based on the chain length of the amphiphile. Products prepared according to the methods disclosed herein are within the scope of this invention. In some preferred embodiments, the monolayers or thin films so prepared are transferable from the supporting surface to another substrate.

In some aspects, this invention discloses a method for preparing a monolayer or a thin film with a patterned nanoscopic wetting surface comprising the steps of:
  a) preparing a polymerizable amphiphile with at least one hydrophobic constituent and one hydrophilic constituent;
  b) preparing a supporting surface;
  c) assembling the polymerizable amphiphile on said supporting surface, wherein said amphiphile adopts a horizontal orientation exposing both hydrophobic and hydrophilic constituents; and
  d) polymerizing assembled polymerizable amphiphile to afford a monolayer or thin film with a patterned nanoscopic wetting surface.

In some other aspects, this invention relates to products of a monolayer or thin film with a patterned nanoscopic wetting surface manufactured according to the method disclosed herein. In some aspects, those monolayer or thin films are transferable from the surface where it is manufactured to another substrate.

In some aspects, this invention discloses a method for controlling patterned nanoscopic wetting, wherein the method comprises the steps of
  a) preparing a polymerizable amphiphile with at least one hydrophobic constituent and one hydrophilic constituent;
  b) preparing a supporting surface;
  c) assembling the polymerizable amphiphile on said supporting surface, wherein said amphiphile adopts a horizontal orientation exposing both hydrophobic and hydrophilic constituents; and d) polymerizing said polymerizable amphiphile to afford a monolayer or thin film with a patterned nanoscopic wetting surface; and e) depositing a liquid or other material, wherein controlled patterned nanoscopic wetting is achieved through accessing both hydrophobic and hydrophilic constituents of said monolayer or thin film with a patterned nanoscopic wetting surface.

Yet in some other aspects, this invention relates to a transferrable monolayer or thin film with a patterned nanoscopic wetting surface manufactured according to the steps of a) preparing a polymerizable amphiphile with at least one hydrophobic constituent and one hydrophilic constituent;

b) preparing a supporting surface;

c) assembling the polymerizable amphiphile on said supporting surface, wherein said amphiphile adopts a horizontal orientation exposing both hydrophobic and hydrophilic constituents; and d) polymerizing said polymerizable amphiphile to afford a transferable monolayer or a thin film with a patterned nanoscopic wetting surface.

In some aspects, this invention relates to a method for preparing a monolayer or thin film with a surface of patterned nanoscopic wetting wherein polymerization is carried out by irradiating of assembled amphiphile with an UV light.

In some other aspects, this invention relates to a method for preparing a monolayer or thin film with a surface of patterned nanoscopic wetting wherein one or more types of amphiphile are used to prepare said monolayer or thin film.

In some other aspects, this invention relates to a method for preparing a monolayer or thin film with a surface of patterned nanoscopic wetting wherein one or more types of amphiphile are used to prepare said monolayer or thin film together with one or more nonpolymerizable amphiphile.

In some other aspects, this invention relates to a method for preparing a monolayer or thin film with a surface of patterned nanoscopic wetting wherein one or more types of amphiphile are used to prepare said monolayer or thin film together with one or more non-amphiphiles.

In some other aspects, this invention relates to a method for preparing a monolayer or thin film with a surface of patterned nanoscopic wetting wherein a horizontally-oriented amphiphile is used in combination with an amphiphile oriented non-horizontally.

In some other aspects, this invention relates to a method for preparing a monolayer or thin film with a surface of patterned nanoscopic wetting on a supporting surface, wherein said supporting surface is graphene, highly oriented pyrolytic graphite, or another layered material including $MoS_2$ and $WS_2$.

In some other aspects, this invention relates to a method for preparing a monolayer or thin film with a surface of patterned nanoscopic wetting wherein said amphiphile is a polymerizable phospholipid.

In some other aspects, this invention relates to a method for preparing a monolayer or thin film with a surface of patterned nanoscopic wetting wherein said phospholipid is 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE), or other like polymerizable amphiphiles.

In some aspects, this invention relates to a monolayer or thin film with a patterned nanoscopic wetting surface, wherein said monolayer or thin film is used to control orientation and/or phase segregation of a block copolymer.

In some other aspects, this invention relates to a monolayer or thin film with a patterned nanoscopic wetting surface, wherein said monolayer or thin film is used to control orientation and/or phase segregation of a block copolymer used for a photovoltaic device.

In some other aspects, this invention relates to a monolayer or thin film with a patterned nanoscopic wetting surface, wherein said monolayer or thin film is transferred to a flexible substrate for a wearable electronic device.

In some aspects, this invention relates to a transferrable monolayer or thin film with a patterned nanoscopic wetting surface, wherein said monolayer or thin film is used to create stacked films of the same or different kind.

In some other aspects, this invention relates to a transferable monolayer or thin film with a patterned nanoscopic wetting surface, wherein said monolayer or thin film is used to create stacked monolayers or thin films of the same of different kind for an organic light emitting diode.

BRIEF DESCRIPTION OF THE DRAWINGS

Embodiments of the present disclosure will now be described by way of example in greater detail with reference to the attached Figs.

FIG. 7B demonstrates thin-film geometries with directional wetting observed at 95% r.h. on diyne PC functionalized surface; FIG. 7C demonstrates thin-film geometries with directional wetting with a nearly circular perimeter observed at 95% r.h. on diyne PC functionalized surface; FIG. 7D shows an enlarged region of FIG. 7C.

DETAILED DESCRIPTION

Figure 1:
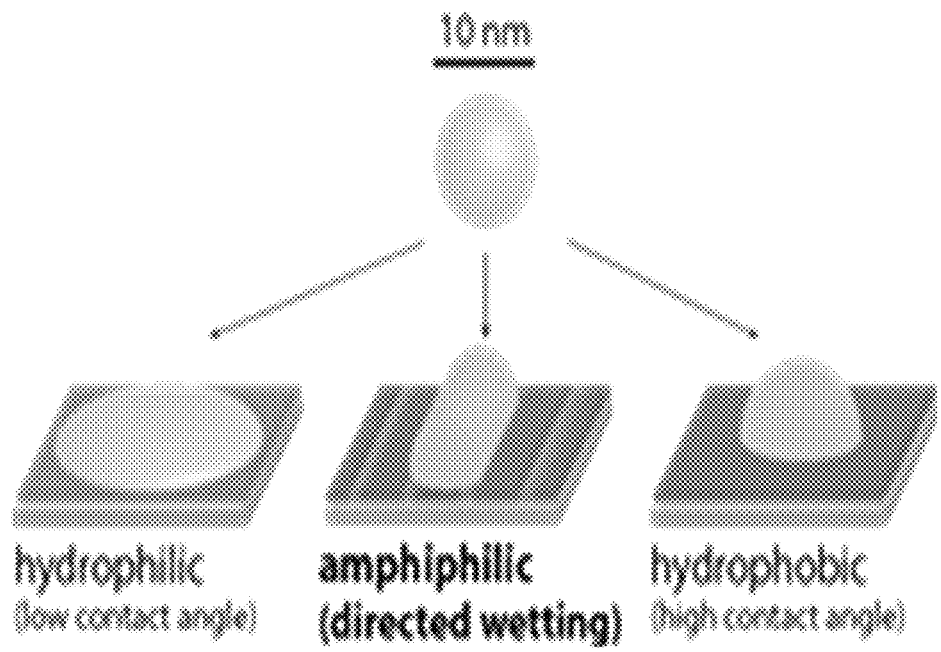
FIG. 1 depicts anisotropic wetting using striped amphiphilic interface chemistry.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range.

As used herein, an "amphiphile" is defined as a chemical compound comprising both hydrophilic and hydrophobic constituents.

As used herein, a "thin film" is defined as a layer of material ranging from less than 1 nm to several thousand nanometers in thickness.

This invention discloses a method for controlling nanoscopic wetting near or at a molecular scale for synthetic material application. In particular this invention relates to a method for preparing a monolayer or thin film with a patterned nanoscopic wetting surface using a 'sitting' phase of polymerizable amphiphile, wherein hydrophobic alkyl chains of the amphiphile extend along a supporting surface and the amphiphile molecules align side-to-side, effectively forming a repeating cross-section of bilayer with alternating hydrophilic and hydrophobic stripes of a ~6 nm pitch tunable based on the chain length of the amphiphile. Products prepared according to the methods disclosed herein are within the scope of this invention. In some embodiments, monolayers or thin films so prepared are transferable.

In some illustrative embodiments, this invention relates to a method for preparing a monolayer, or a thin film with a patterned nanoscopic wetting surface, wherein the method comprises the steps of
  a) preparing a polymerizable amphiphile with at least one hydrophobic constituent and one hydrophilic constituent;
  b) preparing a supporting surface;
  c) assembling the polymerizable amphiphile on said supporting surface, wherein said amphiphile adopts a horizontal orientation exposing both hydrophobic and hydrophilic constituents of said amphiphile; and
  d) polymerizing the assembled amphiphile to afford a monolayer or a thin film with a patterned nanoscopic wetting surface.

In some illustrative embodiments, this invention relates to a method for preparing a monolayer or thin film with a surface of patterned nanoscopic wetting wherein polymerization of the assembled amphiphile is carried out by irradiating assembled polymerizable amphiphile with an UV light.

In another illustrative embodiment, this invention relates to a method for preparing a monolayer or a thin film with a surface of patterned nanoscopic wetting wherein one or more types of amphiphile are involved.

In some other illustrative embodiments, this invention relates to a method for preparing a monolayer or a thin film with a surface of patterned nanoscopic wetting on a supporting surface, wherein said supporting surface comprises graphene, highly oriented pyrolytic graphite, or a layered material, such as $MoS_2$ or $WS_2$.

In some illustrative embodiments, this invention relates to a method for preparing a monolayer or a thin film with a surface of patterned nanoscopic wetting, wherein the polymerizable amphiphile is a phospholipid.

In some illustrative embodiments, this invention relates to a method for preparing a monolayer or thin film with a surface of patterned nanoscopic wetting, wherein the polymerizable amphiphile phospholipid comprises 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE), or an analog thereof.

In some illustrative embodiments, this invention relates to a monolayer or a thin film with a surface of patterned nanoscopic wetting prepared according the methods disclosed herein.

In some illustrative embodiments, this invention relates to a monolayer or a thin film with a surface of patterned nanoscopic wetting prepared according the methods disclosed herein, wherein said monolayer or thin film is used to control orientation and/or phase segregation.

In some illustrative embodiments, this invention relates to a monolayer or a thin film with a surface of patterned nanoscopic wetting prepared according the methods disclosed herein, wherein said monolayer or thin film is used to control orientation and/or phase segregation of a block copolymer.

In some illustrative embodiments, this invention relates to a monolayer or a thin film with a surface of patterned nanoscopic wetting prepared according the methods disclosed herein, wherein said monolayer or thin film is used to control orientation and/or phase segregation of a block copolymer of a photovoltaic device.

In some other illustrative embodiments, this invention relates to a monolayer or a thin film with a surface of patterned nanoscopic wetting prepared according the methods disclosed herein, wherein said monolayer or thin film is a transferable monolayer or thin film.

In some other illustrative embodiments, this invention relates to a monolayer or a thin film with a surface of patterned nanoscopic wetting prepared according to the methods disclosed herein, wherein said monolayer or thin film is transferable to another substrate.

In some other illustrative embodiments, this invention relates to a monolayer or a thin film with a surface of patterned nanoscopic wetting prepared according the methods disclosed herein, wherein said monolayer or thin film is transferred to a flexible substrate for a wearable electronic device.

In some other illustrative embodiments, this invention relates to a monolayer or a thin film with a surface of patterned nanoscopic wetting prepared according the methods disclosed herein, wherein said monolayer or thin film is used to create stacked monolayers or thin films of the same or different kind.

In some other illustrative embodiments, this invention relates to a monolayer or a thin film with a surface of patterned nanoscopic wetting prepared according to the methods disclosed herein, wherein said monolayer or thin film is used to create stacked monolayers or thin films for an organic light emitting diode.

In some illustrative embodiments, this invention relates to a method for controlling patterned nanoscopic wetting comprising the steps of
   a) preparing a polymerizable amphiphile with at least one hydrophobic constituent and one hydrophilic constituent;
   b) preparing a supporting surface;
   c) assembling the polymerizable amphiphile on said supporting surface, wherein said amphiphile adopts a horizontal orientation exposing both hydrophobic and hydrophilic constituents of said amphiphile;
   d) polymerizing assembled amphiphile to afford a monolayer or a thin film with a patterned nanoscopic wetting surface; and
   e) depositing a liquid or other material, wherein controlled patterned nanoscopic wetting is achieved through accessing both hydrophobic and hydrophilic constituents of said monolayer or thin film with the patterned nanoscopic wetting surface.

In some other illustrative embodiments, this invention relates to a method for controlling patterned nanoscopic wetting disclosed herein, wherein polymerization is performed by irradiating the assembled amphiphile with an UV light.

In some illustrative embodiments, this invention relates to a method for controlling patterned nanoscopic wetting disclosed herein, wherein said liquid or other material is an organic or inorganic material.

In some illustrative embodiments, this invention relates to a method for controlling patterned nanoscopic wetting disclosed herein, wherein said liquid or other material interacts with said monolayer or thin film with a patterned nanoscopic wetting surface through covalent or ionic bonding, or through other chemical interactions, creating defined regions of a new surface chemistry.

In some illustrative embodiments, this invention relates to a method for controlling patterned nanoscopic wetting disclosed herein, wherein depositing a liquid or other material is carried out by electrospray, spin-coating, drop-casting, or the like, wherein wetting properties of said liquid or other material on said monolayer or thin film with a patterned nanoscopic wetting surface are controlled by head groups, tail groups, or both, of said amphiphile.

In some illustrative embodiments, this invention relates to a method for controlling patterned nanoscopic wetting disclosed herein, wherein one or more types of amphiphile are used to prepare said monolayer or thin film together with one or more nonpolymerizable amphiphile.

In some illustrative embodiments, this invention relates to a method for controlling patterned nanoscopic wetting disclosed herein, wherein one or more types of amphiphile are used to prepare said monolayer or thin film together with one or more non-amphiphiles.

In some illustrative embodiments, this invention relates to a method for controlling patterned nanoscopic wetting disclosed herein, wherein a horizontally-oriented amphiphile is used in combination with an amphiphile oriented non-horizontally in preparing said monolayer or thin film with a patterned nanoscopic wetting surface.

In some other illustrative embodiments, this invention relates to a method for controlling patterned nanoscopic wetting disclosed herein, wherein said supporting surface is graphene, highly oriented pyrolytic graphite, or a layered material, including that of $MoS_2$ or $WS_2$.

In some illustrative embodiments, this invention relates to a method for controlling patterned nanoscopic wetting disclosed herein, wherein said amphiphile is a polymerizable phospholipid.

In some illustrative embodiments, this invention relates to a method for controlling patterned nanoscopic wetting disclosed herein, wherein said polymerizable phospholipid is 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE), or an analog thereof.

In some other illustrative embodiments, this invention relates to a monolayer or thin film with a patterned nanoscopic wetting surface prepared according to the steps of:
   a) preparing a polymerizable amphiphile with at least one hydrophobic constituent and one hydrophilic constituent;
   b) preparing a supporting surface;
   c) assembling the polymerizable amphiphile on said supporting surface, wherein said amphiphile adopts a horizontal orientation exposing both hydrophobic and hydrophilic constituents of said amphiphile; and
   d) polymerizing the assembled amphiphile on said supporting surface to afford a monolayer or thin film with a patterned nanoscopic wetting surface.

In some other illustrative embodiments, this invention relates to a monolayer or thin film with a patterned nanoscopic wetting surface prepared according the steps disclosed herein, wherein said monolayer or thin film is transferable.

In some other illustrative embodiments, this invention relates to a monolayer or thin film with a patterned nanoscopic wetting surface prepared according the steps disclosed herein, wherein said monolayer or thin film is used to control orientation and/or phase segregation.

Liquid wetting behavior changes significantly at very short length scales, mirroring confinement effects in inorganic solid-state structures with high surface-area-to-volume ratios (Bocquet, L., et al., *Chem. Soc. Rev.* 2010, 39, 1073-1095; Brus, L. E., et al., *J. Chem. Phys.* 1984, 80, 4403-4409). In droplets with diameters <1 μm, line tension due to the increased energy of molecules near the three-phase liquid-vapor-solid line can increase contact angles versus macroscopic values, an effect that becomes progressively more important as diameter decreases (Drelich, J. et al., *J. Coll. Inter. Sci.* 1993, 155, 379-385). Similarly, as film thicknesses decrease below 20 nm, liquid-solid and liquid-vapor interfaces begin to interact more strongly as the distance (D) between them decreases, creating disjoining pressure ($\Pi \propto D^{-3}$), that can vary local film thickness (Hu, H. et al, *Appl. Phys. Lett.* 2013, 103). For even thinner films (<5 nm), a significant fraction of the molecules in the film lie near enough to the liquid-solid or liquid-vapor interface to produce ordered structures (e.g. water ice layers adjacent to graphene, glycerol layers on metals) (Kimmel, G. A., et al., *J. Am. Chem. Soc.* 2009, 131, 12838-12844; Algara-Siller, G. et al., *Nature* 2015, 519, 443-447) different than those observed in the bulk liquid (Bocquet, et al., 2010). Thus, the importance of surface chemistry and topography increases dramatically for ultrathin films with thicknesses that approach the molecular scale.

The behavior of functional groups that define wettable and non-wettable patterned areas also begins to change at boundaries, again producing an equivalent of confinement effects. Ionizable groups such as COOH commonly used to pattern wetting undergo substantial $pK_{1/2}$ shifts at hydrophilic/hydrophobic (high-dielectric/low-dielectric) interfaces, due in part to the limited ability of the nonpolar side of the interface to stabilize the charged form of the functional group (Lee, T. R., et al., *Langmuir* 1994, 10, 741-749). Early contact angle titrations by Whitesides and coworkers found that in monolayers of COOH-terminated alkanethiols on Au(111), the $pK_{1/2}$ of the COOH group was ≈8, vs 4.7 for acetic acid in dilute aqueous solution (Lee, T. R. et al., 1994). In the same study, for 15% COOH/85% $CH_3$-terminated alkanethiol monolayers, the $pK_{1/2}$ of the COOH groups was as high as 11. Thus, while 2D (planar) assemblies of functional groups undergo significant shifts in $pK_{1/2}$, this suggests that 1D (linear) or 0D (point) assemblies of the same functional groups in a nonpolar matrix experience progressively stronger shifts that further limit their wettability. Because the length scales over which these effects become important is relatively short, wettable patterns at the somewhat larger length scales (>10 nm) associated with soft and scanning probe lithography function as 2D assemblies. However, as wettable ligand patterns approach the molecular scale, an increasing proportion of functional groups lie directly on a high-dielectric/low-dielectric boundary, presumably causing a transition from 2D to 1D wettability (i.e. restricting ionization). This necessitates the use and/or development of stronger wetting chemistry for structuring the environment around a nonpolar layered material using striped ligand phases.

Biology provides useful design paradigms for complex self-assembled structures that have been leveraged to address a growing set of needs in synthetic nanostructured materials (Peng, Z. B. et al., *Chem. Mater.* 2016, 28, 1012-1021; Claridge, S. A. et al., *J. Am. Chem. Soc.* 2013, 135, 18528-18535). Although local differences in wettability play significant roles in the assembly of DNA and proteins, wetting orthogonality is the foundation of the cell membrane—the 6-nm hydrophilic-hydrophobic-hydrophilic cross-section of the lipid bilayer controls the flow of water, ions, and other small molecules, while the chemistry of weak acids and bases is utilized routinely in the membrane periphery. Phosphoglycerolipids, comprising 60-80% of eukaryotic lipid membrane content, have a polyfunctional polar headgroup structure that is especially well-suited to promoting wetting orthogonality at short length scales, suggesting possible utility in controlling wetting at layered material interfaces.

Figure 2A:
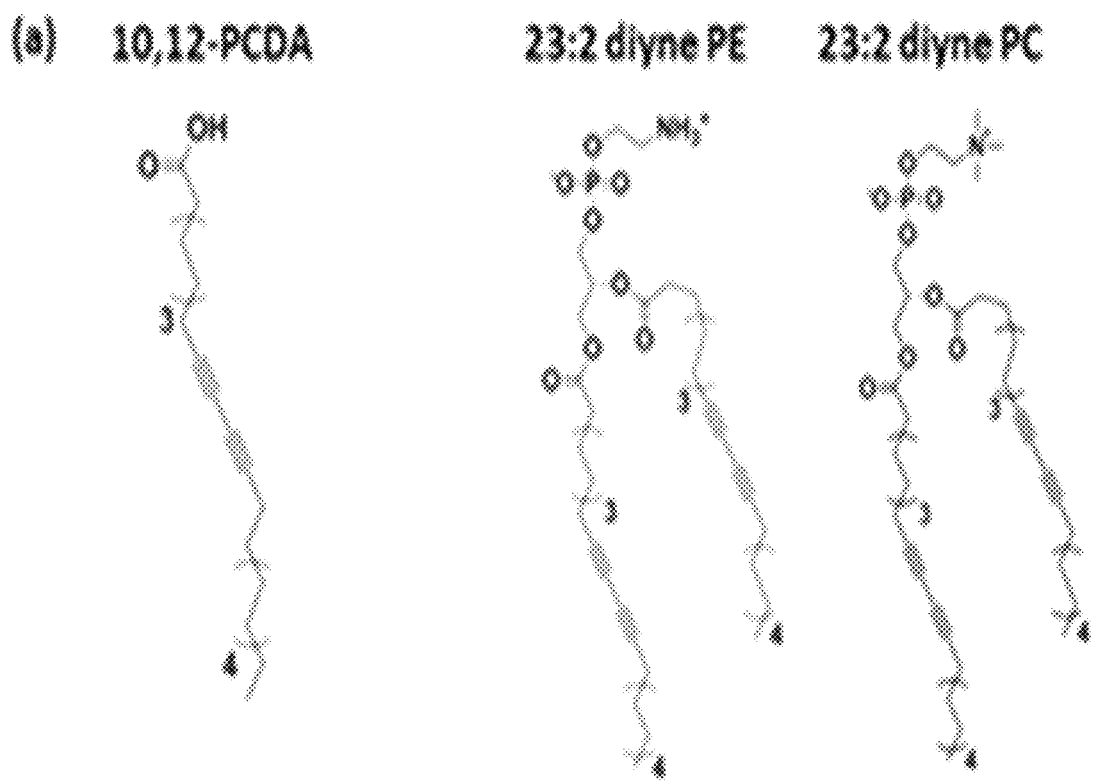
FIG. 2A shows the structures of polymerizable amphiphile used in this disclosure: 10,12-pentacosadiynoic acid (PCDA), 1,2-bis(10,12-tricosadiynoyl)-sn-glycero-3-phosphoethanolamine (diyne PE), and 1,2-bis(10,12-tricosadiynoyl)-sn-glycero-3-phosphocholine (diyne PC).
Figure 2B:
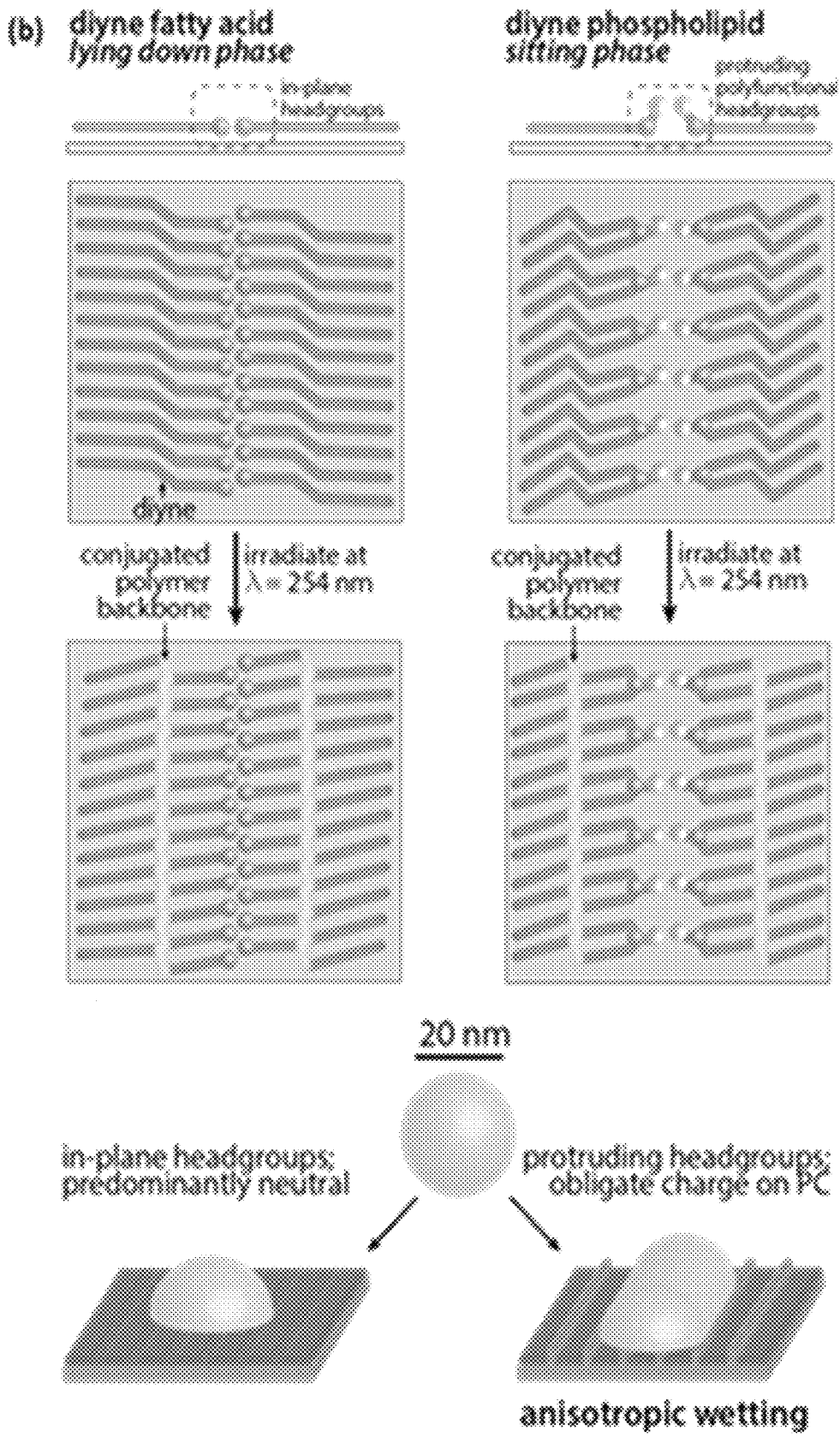
FIG. 2B is the schematic of nanoscale surface patterning using polymerizable amphiphiles.

Recently, we have found that on layered materials such as highly oriented pyrolytic graphite (HOPG), it is possible to reorient lipids from the 'standing' structure observed in biological membranes to a 'sitting' orientation that exposes both their hydrophilic and hydrophobic components and creates a small topographic protrusion for the terminal functionality, negating interfacial $pK_{1/2}$ shifts for that ionizable group (Bang, et al, 2016). Here, we use the high degree of wetting orthogonality intrinsic to the phospholipid architecture to direct nanoscopic wetting on layered materials (FIGS. 2A and 2B). First, we demonstrate that the strongly-wetting phospholipid headgroups increase droplet capture efficiency (vs. similarly ordered phases of fatty acids or bare HOPG) and support spreading of ultrathin (<5 nm) films for droplets of sufficiently low viscosity. Then, we further show that phosphocholine headgroups, carrying an obligate charge, can produce nanoscopic directional wetting for films 1-2 nm thick, similar to the dimensional regime in which confinement effects are observed for liquids in nanopores (Bocquet, et al., 2010). Taken together, these findings point toward principles for utilizing dimensionally ordered surface chemistry on layered materials to precisely pattern the formation of films and other environmental interfaces important for integration into hybrid materials and devices.

Results and Discussion

Assembly of Amphiphilic Monolayers.

To examine the role of headgroup architecture in directing nanoscopic wetting on striped amphiphilic interfaces near the molecular scale, we prepared monolayers of both phospholipids and fatty acids (FIG. 2A), and compared their nanoscopic wetting properties with those of bare HOPG. Long-chain polymerizable amphiphiles (e.g. 10,12-pentacosadiynoic acid (PCDA), FIG. 2A) are known to assemble into lamellar phases on HOPG (FIG. 2B) based on epitaxy between the zig-zag alkyl backbone and the hexagonal graphite lattice (Okawa, Y. et al., *J. Chem. Phys.* 2001, 115, 2317-2322; Okawa, Y., et al., *Nanoscale* 2012, 4, 3013-3028). Molecules within the monolayer adopt a head-to-head orientation, creating hydrogen-bonded COOH dimers that further stabilize the monolayer, and resulting in edge-to-edge lamellar periodicities (~6.2 nm for PCDA) that vary with the chain length. Assembly of long-chain carboxylic acids (and other amphiphiles) containing an internal diyne can align the diyne functionalities for topochemical photopolymerization, which has been investigated previously by others due to the useful semiconducting properties of the conjugated ene-yne polymer backbone formed (FIG. 2B, bottom left) (Okawa, et al., 2001 and 2012).

Here, we instead utilize the aligned rows of head and tail functionalities to present precise, alternating stripes of hydrophilic and hydrophobic surface chemistry on a ~6-nm scale, with a hydrophilic stripe width of ~1 nm, well below scales accessible through previously explored methods for interfacial patterning (Xia, D. Y., et al., *Adv. Mater.* 2012, 24, 1287-1302).

Structural Differences Between Lying-Down and Sitting Phases.

While diynoic fatty acids adopt a true lying-down geometry, bringing the carboxylic acid very near the nonpolar HOPG interface, we recently observed that diynoic phospholipids assembled in similar monolayers preferentially adopt a 'sitting' geometry (FIG. 2B, right) (Bang, et al., 2016). In this orientation, the phosphate sits adjacent to the nonpolar HOPG interface, and the terminal functional group ($-NH_3^+/-NH_2$ for diyne PE and $-N(CH_3)_3^+$ for diyne PC) projects into solvent. In the context of controlling interfacial wetting, this has two important consequences for sitting vs. lying down phases. (1) The terminal functional protrusion creates sub-nanometer surface ridges, topographic features that have the potential to amplify local wetting differences in a manner analogous to topographic features utilized in designing super hydrophobic and other wetting-controlled surfaces (Lafuma, A. et al., *Nat. Mater.* 2003, 2, 457-460). (2) Both the COOH in PCDA and the phosphate in diyne PE and diyne PC undergo 4-5 unit $pK_a$ shifts due to their positions directly adjacent to the HOPG interface.[11] For PCDA, this results in a $pK_{1/2}$ (COOH) ~9.5, and an interface chemistry that is predominantly neutral at lower pH values. In contrast, a similar shift for the phosphate in diyne PE and diyne PC results in $pK_{1/2}$ ($-HPO_4-$) ~5.5. Simultaneously, the terminal functional group in the phospholipids maintains its solution ionization behavior ($pK_{1/2}$ (diyne PE—$NH_3^+$)=11), due to both its projection from the interface and the presence of the charged phosphate. Thus, at least one functional group in each phospholipid monolayer remains charged across much of the pH range commonly used for solution processing, maximizing the hydrophilicity of the region around the headgroups.

In macroscopic wetting experiments such as contact angle titrations we have conducted on these monolayers previously (Bang, et al., 2016), the size of the droplet (diameter ~1 mm) greatly exceeds both the ~6 nm periodic width of the striped hydrophilic-hydrophobic patterning, and the 100 nm-1 μm size of typical ordered domains. Thus, there is not an obvious departure from the spherical cap droplet geometry when measuring macroscopic contact angles. However, previous experiments by Whitesides and others have indicated that when the length scale of wetting (e.g. droplet diameter) approaches the scale of chemical heterogeneity on the substrate, anisotropic wetting effects (e.g. differences in contact angle and/or droplet aspect ratio) can emerge in directions parallel and perpendicular to the patterned chemical heterogeneity (Drelich, J., et al., Langmuir 1996, 12, 1913-1922; Bliznyuk, O., et al., Phys. Rev. E 2009, 79; Jansen, H. P., et al., Langmuir 2014, 30, 11574-11581).

Evaluation of Monolayer Topographic and Electronic Structure Relevant to Wetting.

Figure 3A:
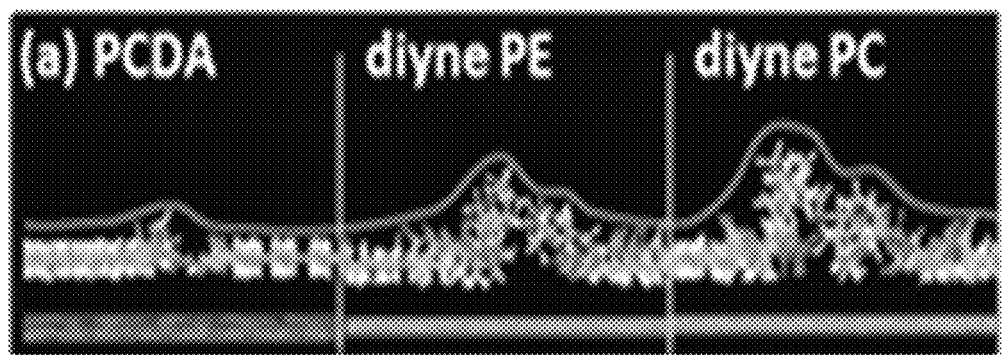
FIG. 3A depicts simulated headgroup orientations for lying down phases of PCDA and sitting phases of diyne PE and diyne PC.
Figure 3B:
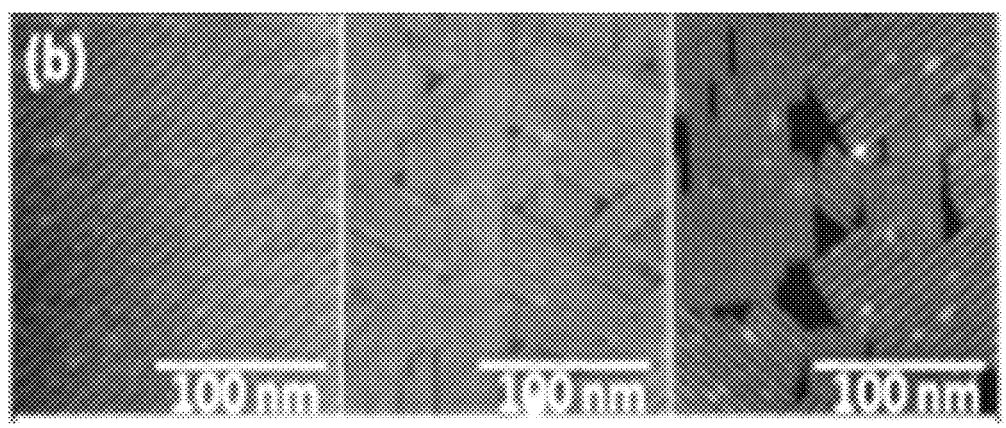
FIG. 3B shows AFM images of monolayers of PCDA, diyne PE and diyne PC.
Figure 3C:
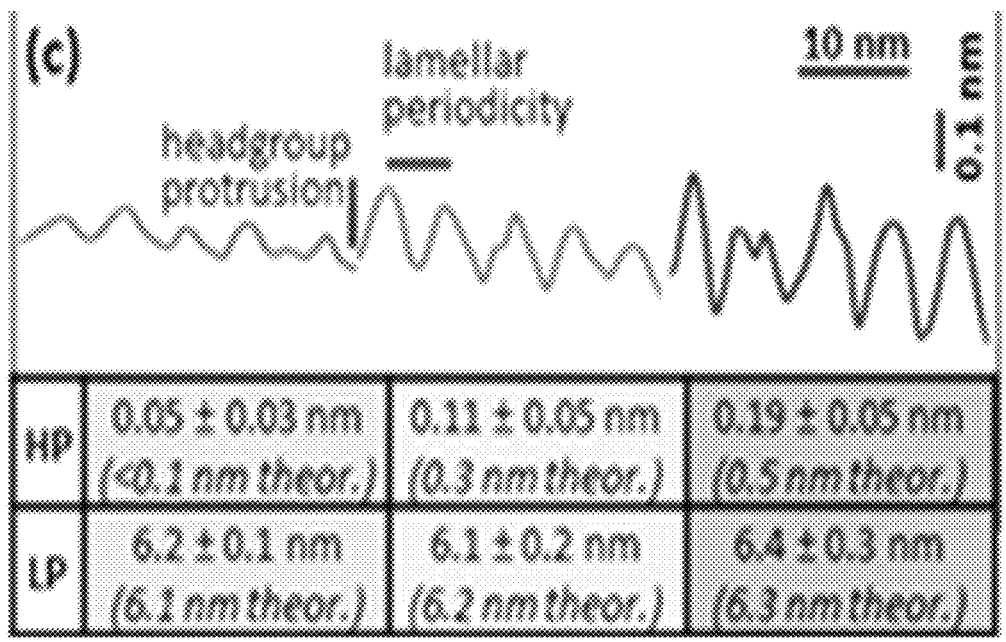
FIG. 3C shows line profiles extracted from AFM images; average topographic protrusions and lamellar periodicity.

Topographical differences visible in high-resolution AFM images (FIG. 3B) are commensurate with those predicted by minimized molecular models based on molecular dynamics simulations in explicit water (FIG. 3A). Line profiles extracted from AFM topography images of the three types of amphiphile (FIG. 3C) reveal headgroup protrusions (calculated as the average peak-to-images), yielding values of 0.05±0.03 nm for PCDA, with larger values of 0.11±0.05 nm for diyne PE, and 0.19±0.05 nm for diyne PC commensurate with the sitting phase morphology. Lengths of the alkyl chains in the three molecules are very similar, leading to lamellar periodicities ranging from 6.1±0.2 nm for diyne PE (smallest) to 6.4±0.3 nm for diyne PC (largest).

Figure 4A:
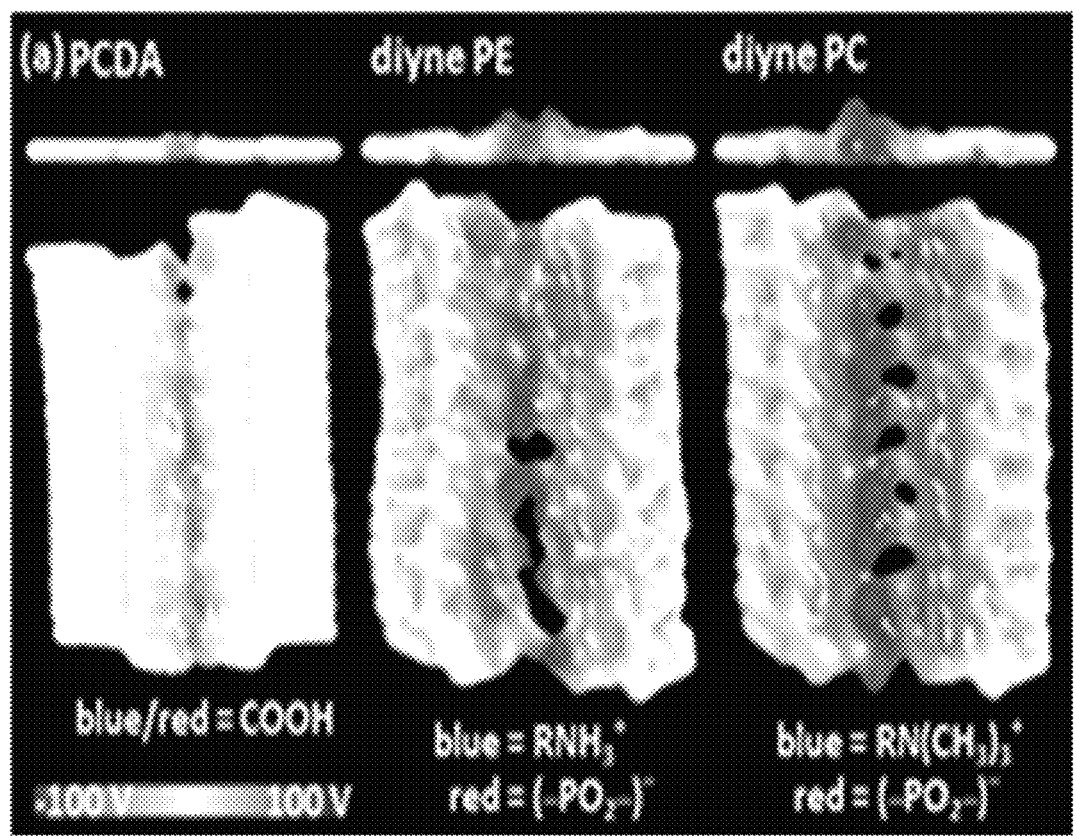
FIG. 4A depicts electrostatic maps of monolayers of PCDA, diyne PE, and diyne PC.
Figure 4B:
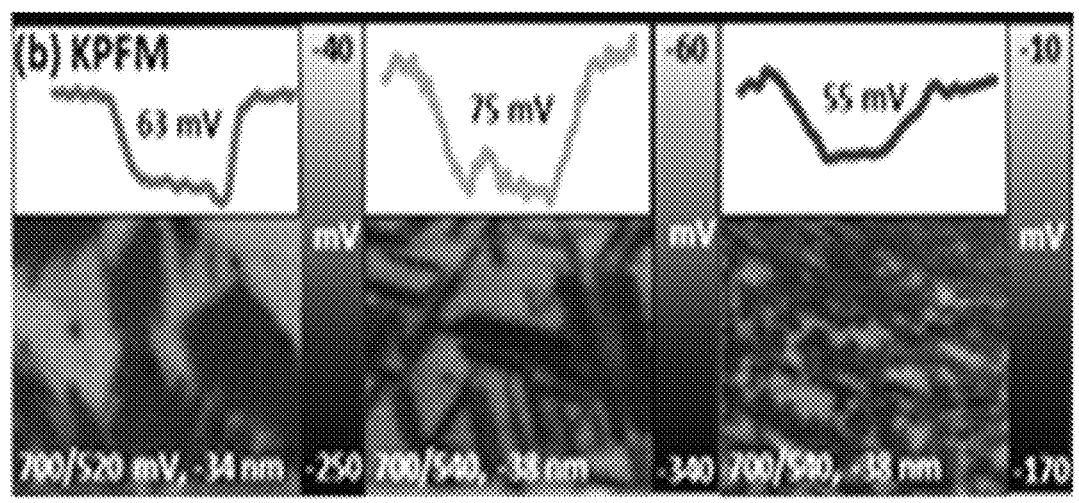
FIG. 4B is Kelvin probe force microscopy (KPFM) of monolayers.

Electrostatic surface maps of monolayers of amphiphile on graphite (FIG. 4A) also reveal differences in the surface electronic structure relevant to liquid droplet impact and sticking. Because the monolayers are prepared via Langmuir-Schaefer transfer, we model both phospholipid headgroups as zwitterions (FIG. 4A, middle and right columns), while PCDA headgroups are modeled in the neutral state (FIG. 4A, left column), consistent with their very weak acidity in the nonpolar environment of the HOPG surface. Vacuum models ($\varepsilon=1$) illustrate the maximum potential experienced by droplets as they approach the monolayer surface; of the three monolayers structures, the electrostatic potential map for diyne PC is the most strongly polarized. KPFM line scans (FIG. 4B) are similar for monolayers of each molecule, with small (55-75 mV) decreases in CPD characteristic of π-conjugated molecular systems, suggesting that differences in observed wetting behavior are primarily due to topography and functionality at the environmental interface rather than modulations to substrate electronic structure.

Electrospray Studies of Single-Component Monolayers.

To test nanoscopic wetting behavior of our striped amphiphilic films, we constructed a nanoelectrospray capillary capable of generating nanoscale droplets with diameters in a size regime similar to that of the striped amphiphilic chemistry on the surface (Karas, M. et al., Fresen J. Anal. Chem. 2000, 366, 669-676). Previous work by others on nanoelectrospray droplet generation indicates that initial droplet diameters are on the order of 200 nm, and decrease as the droplets travel from the capillary orifice toward the sample, due to both evaporation and Coulomb explosions (Juraschek, R. et al., J. Am. Soc. Mass Spectr. 1999, 10, 300-308). Because the rate of evaporation from the droplet surface is strongly dependent upon environmental humidity, the electrospray emitter was housed in an environmental chamber to enable humidity control. For the measurements here, we chose an aqueous solution of glycerol, a low-vapor pressure solvent ($1\times10^{-4}$ Torr (20° C.), vs. 17.5 Torr (20° C.) for water) that facilitates imaging on the relatively long timescales (10-100 min) typically necessitated by AFM.

Figure 5A:
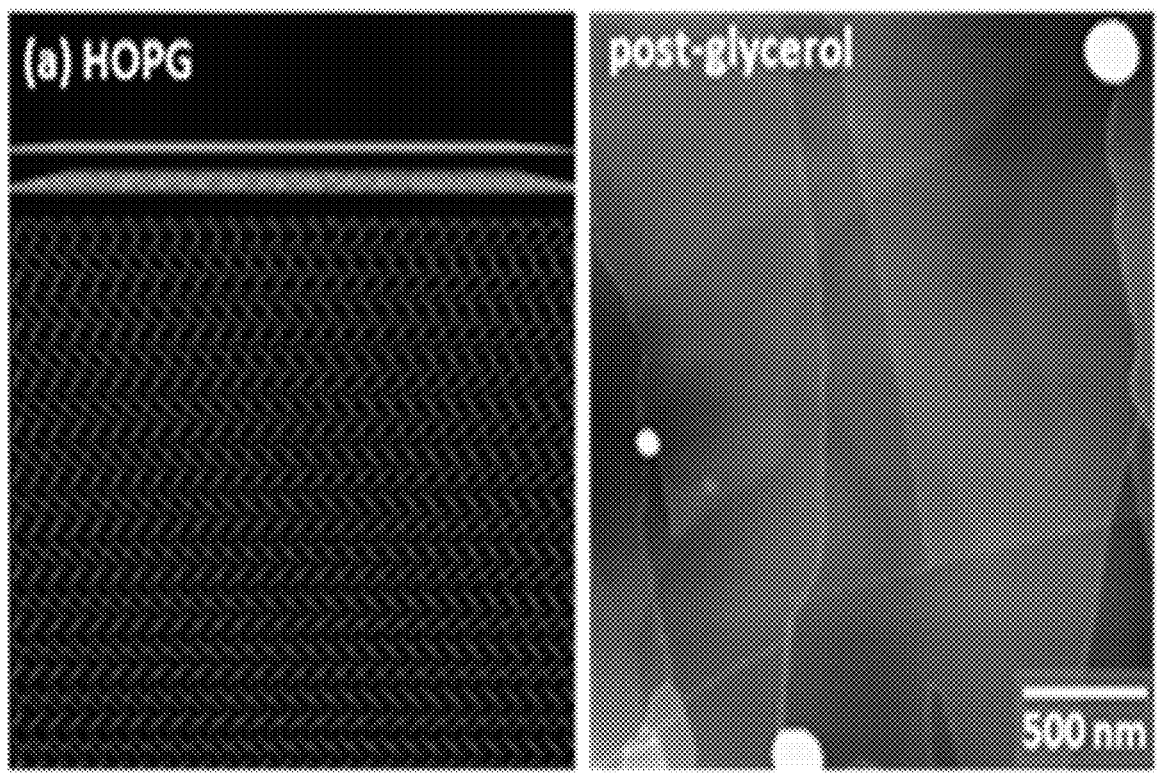
FIG. 5A shows an energy-minimized model of bare highly oriented pyrolytic graphite (HOPG) (left), and an AFM topography image after exposure to glycerol spray (right)
Figure 5B:
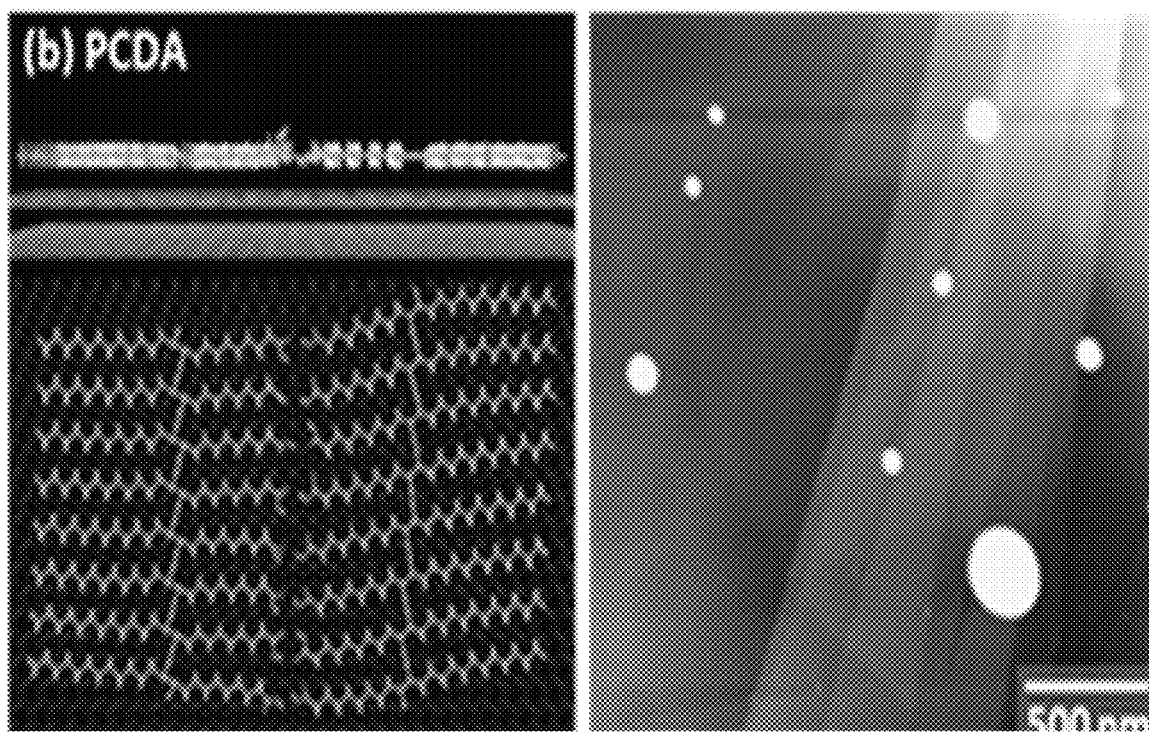
FIG. 5B shows an energy-minimized model of PCDA monolayer assembled on HOPG (left), and an AFM topography image after exposure to glycerol spray (right)
Figure 5C:
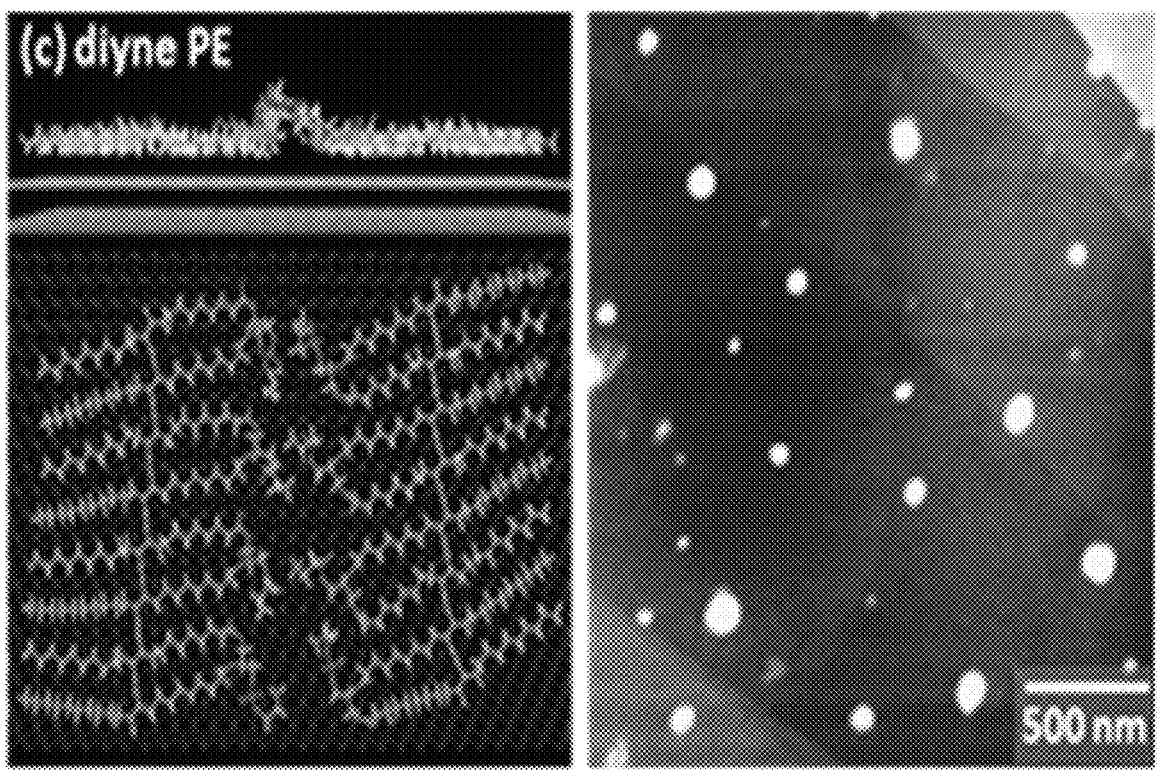
FIG. 5C shows an energy-minimized model of diyne PE monolayer assembled on HOPG (left), and an AFM topography image after exposure to glycerol spray (right)
Figure 5D:
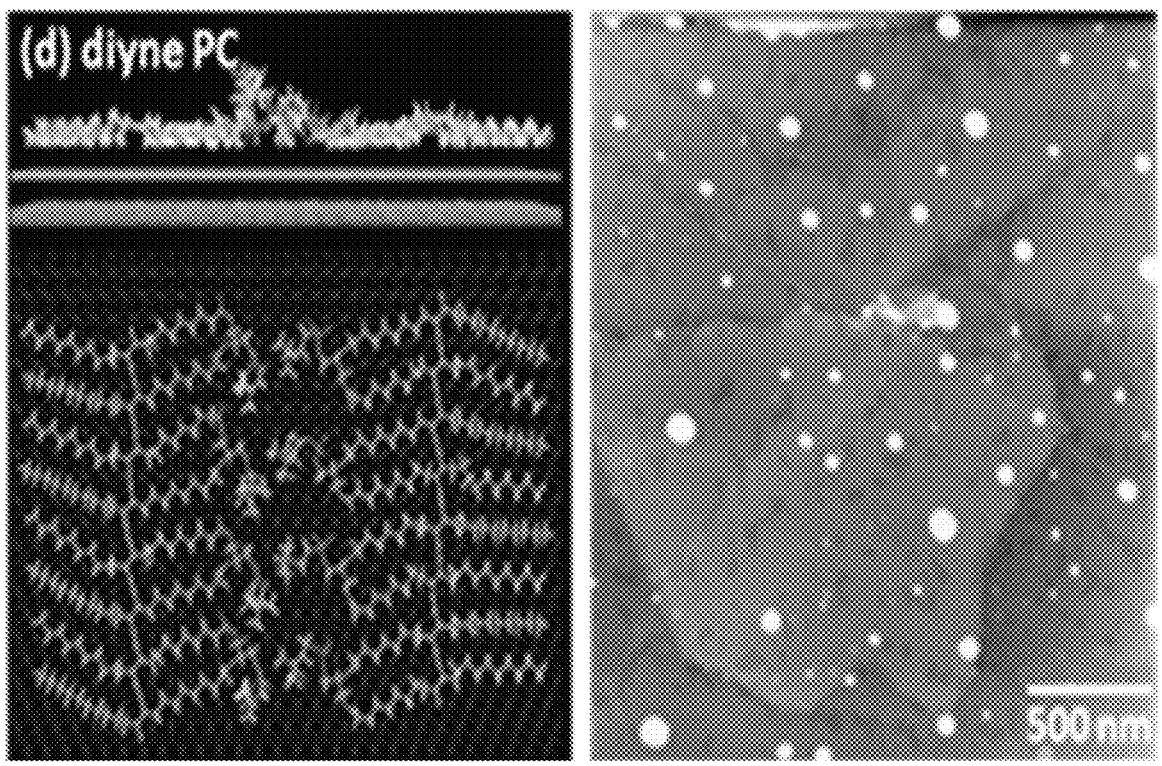
FIG. 5D shows an energy-minimized model of diyne PC monolayer assembled on HOPG (left), and an AFM topography image after exposure to glycerol spray (right).

On bare HOPG (FIG. 5a), droplets of glycerol solution are observed primarily at step edges following electrospray deposition (FIG. 5A, right), with large (>1 μm$^2$) areas of the surface free of visible droplets. On HOPG coated with monolayers of polymerized PCDA (FIG. 5B), similarly, droplets are typically observed at step edges or the edges of molecular domains. Samples of HOPG functionalized with either diyne PE (FIG. 5C) or diyne PC (FIG. 5D) exhibit very different wetting behavior, with most drops positioned at domain interiors (54%) vs at domain edges (23%) or HOPG step edges (23%). On the phospholipid monolayers, typical droplet diameters are smaller than droplets observed on HOPG or PCDA, with smaller distances between drops. Because samples are subjected to the same electrospray conditions, this suggests a high degree of mobility for droplets on HOPG and PCDA, with droplet impacts in most areas of the surface resulting in bouncing or rolling, frequently observed on lower-wettability surfaces (Josserand, C. et al., Annu. Rev. Fluid Mech. 2016, 48, 365-391; Koplik, J. et al., Phys. Fluids 2013, 25, 12). Line profiles from AFM images similar to those in FIG. 5 were used to estimate contact angles for drops with diameters of 50-100 nm visible on each sample. Out of the three monolayer chemistries tested, the mean contact angle was lowest for diyne PC (14°±8°), consistent with its slightly greater headgroup protrusion and obligate charge on the terminal quaternary ammonium functionality.

Formation of Ultra-Thin Films with Directional Wetting.

Having identified diyne PC as the most strongly wetting surface chemistry, we began to test whether it could be used to direct and confine nanoscopic wetting. Most droplets produced through the electrospray process have diameters (20-200 nm) that represent several stripe widths (~6 nm); previous work on microscale droplets predicts relatively modest wetting anisotropy for striped surfaces until droplet diameters approach stripe width (Bliznyuk, et al., 2009). However, we postulated that it would be possible to test for anisotropy and directional wetting effects by causing larger droplets to spread to a thickness (<5 nm) at which the influence of the headgroup chemistry becomes stronger.

The spray deposition procedure we use to deliver droplets to the surface provides a means to modulate viscosity, one of the key parameters affecting droplet fluid dynamics upon impact (Josserand, et al., 2016; Oron, A. et al., Rev. Mod. Phys. 1997, 69, 931-980). Viscosity of glycerol-water mixtures at 20° C. can vary from 1.005 mPa·s for pure water to 1500 mPa·s for pure glycerol. Increasing environmental humidity during the spray process limits water losses from the droplet surface during transit, decreasing viscosity at impact. Impact behavior of a droplet is frequently understood in terms of the Reynolds number ($Re=\rho_l DV/\mu_l$), and Weber number ($We=\rho_l DV^2/\gamma$), which relate droplet density ($\rho_l$), diameter (D), and velocity (V) to either the dynamical viscosity ($\mu_l$) or the liquid-vapor surface tension ($\gamma$) (Josserand, et al., 2016). Thus, increases in viscosity and/or surface tension can offset increases in droplet diameter or velocity during the initial impact, in which higher values of Re and We are commonly associated with increased spreading. Subsequent spreading dynamics and drying behavior are influenced by the properties of the substrate including contact angle (e.g. due to surface chemistry) and distribution of surface roughness. Because the surface tensions for water (72.8 mN/m) and glycerol (64 mN/m) are similar, we expect the primary difference in spreading behavior at higher relative humidity to arise from lower viscosity.

Figure 6A:
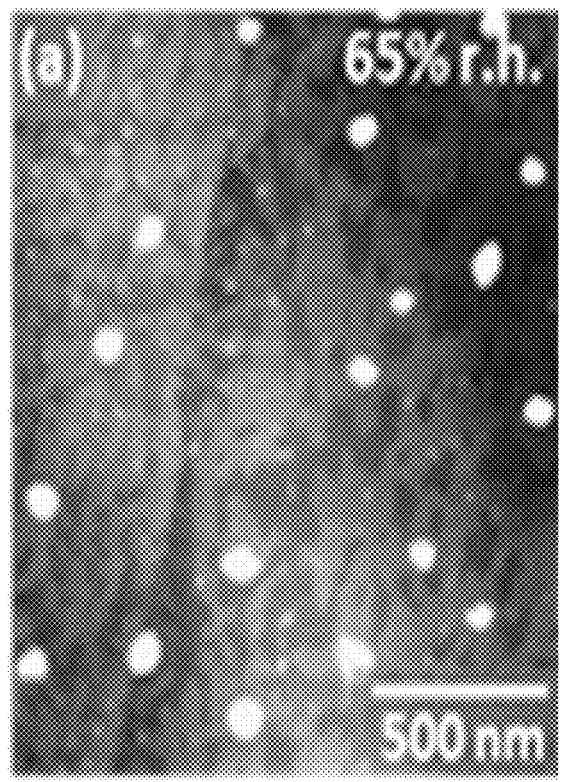
FIG. 6A depicts spherical cap droplet geometries observed when 1% aqueous glycerol is sprayed in a 65% r.h. (relative humidity) environment.
Figure 6B:
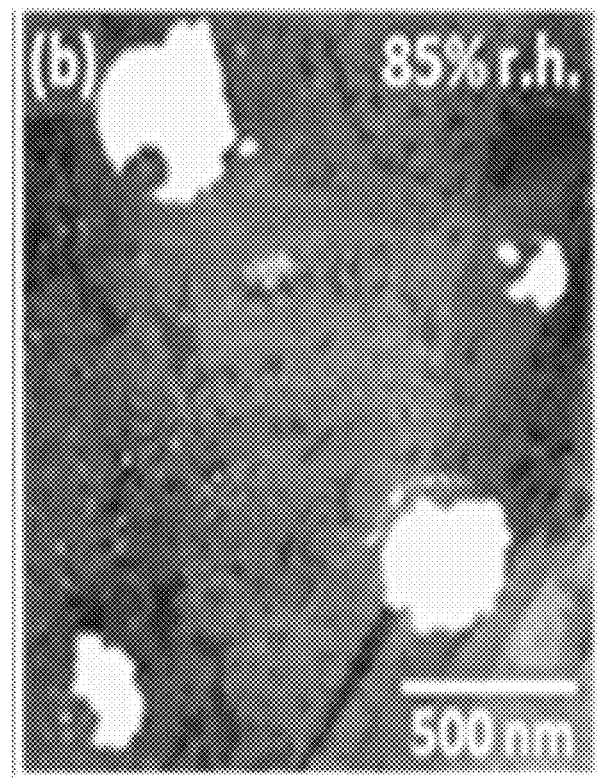
FIG. 6B shows thin-film wetting geometry observed at 85% r.h.
Figure 6C:
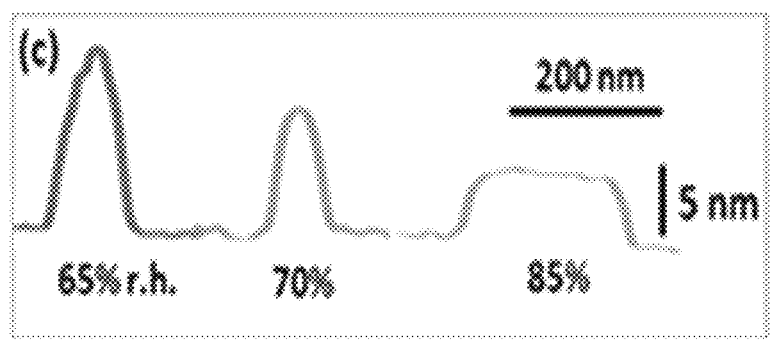
FIG. 6C depicts line scans over typical drops at 65%, 70%, and 85% r.h., showing transition from spherical cap to pancake geometry.

At environmental humidity levels up to 70%, observed droplets retain spherical cap morphologies (FIG. 6A, and FIG. 6C left and middle line scans). Above 70% r.h. (relative humidity), droplets begin to adopt a 'pancake' cross-section (FIG. 6B) with a thickness from 2 to 6 nm (FIG. 6C, right line scan). Flattened droplet impact profiles are consistent with mm and μm droplet impacts in Re regimes in which droplets undergo significant inertial spreading, but do not fragment (Dhiman, R. et al., *Phys. Fluids* 2008, 20). Similar flattened films are observed for diyne PE but not for PCDA, underlining the key role of the headgroup structure in directing wetting.

Figure 7A:
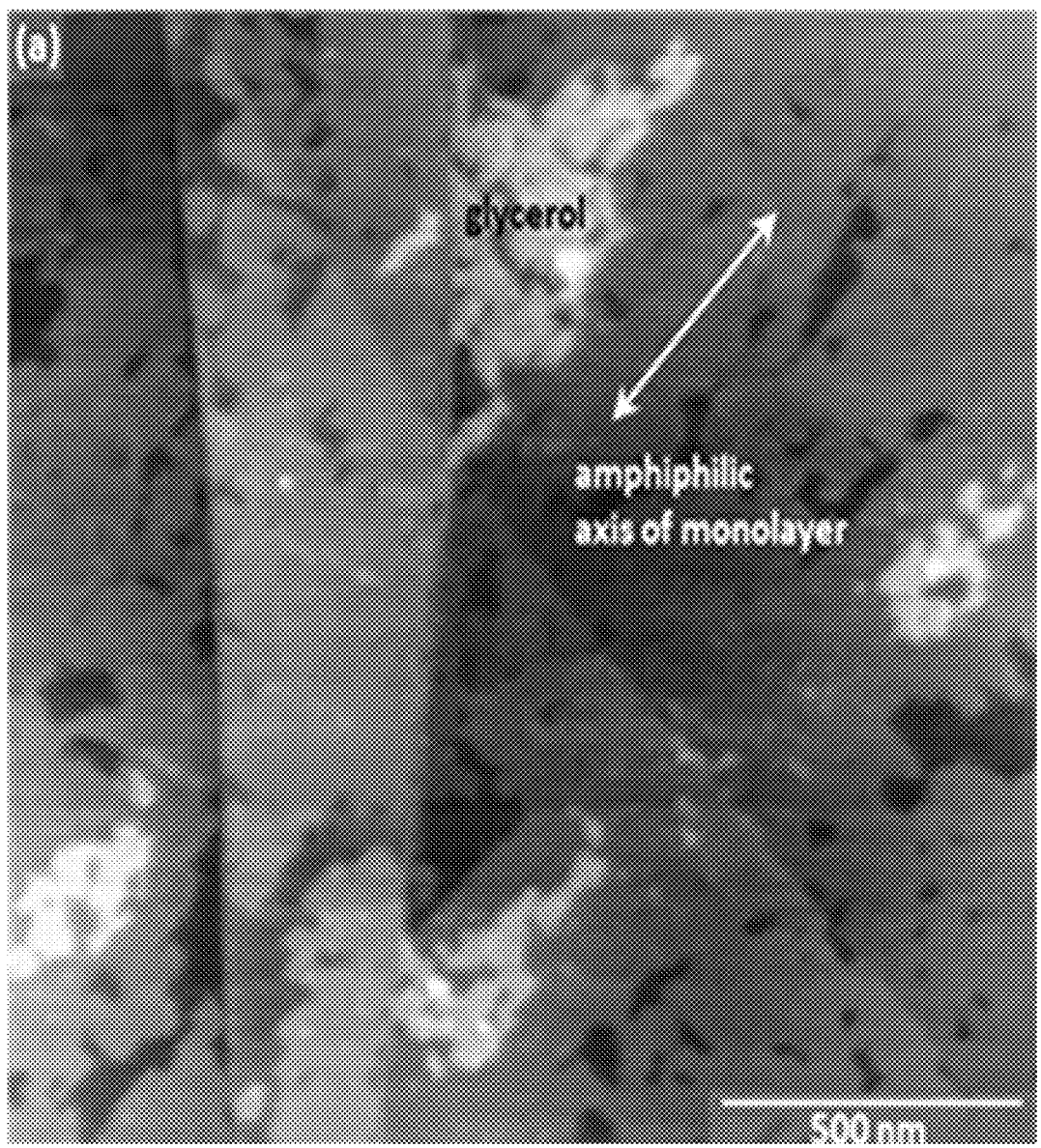
FIG. 7A demonstrates thin-film geometries with directional wetting observed at 95% r.h. on diyne PC functionalized surface.

At very high relative humidity (94-96%), droplets on diyne PC-functionalized surfaces (but not PCDA or diyne PE) begin to exhibit strong directional wetting effects. In some cases (FIGS. 7A and 7B), film geometry suggests oblique droplet impacts convolved with directional spreading, while in others (FIG. 7C), a nearly-circular perimeter is visible, with ray-like protrusions along one or more of the monolayer lattice directions suggestive of splashing. The FIG. 7*d* shows an enlarged region from the image in FIG. 7C, in which the droplet has spread directionally along two domains of the monolayer with different amphiphilic axes. In this region, the liquid film has ruptured into a set of linear features oriented epitaxially with the amphiphilic axes of the underlying monolayer. Previous studies of fluids in nanopores suggest that liquid confinement effects related to wall chemistry begin at length scales of ~2 nm, very similar to the film thicknesses below which we observe directional wetting based on headgroup chemistry here (Bocquet, et al., 2010).

Figure 8:
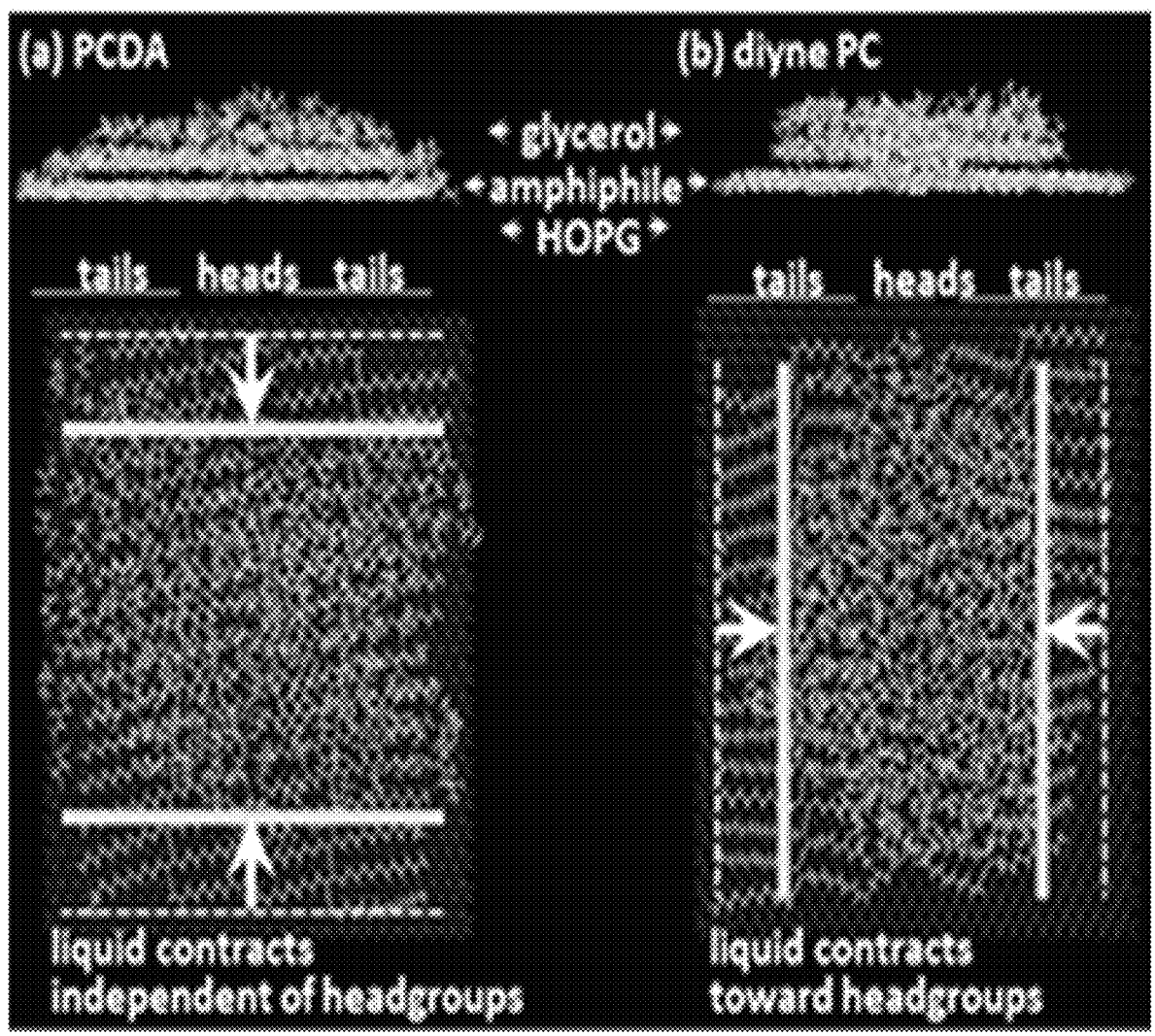
FIG. 8 shows molecular dynamics simulations of glycerol film structure on (a) PCDA and (b) diyne PC monolayers, showing side view and top view of each monolayer. In top view, dotted lines show initial extent of the liquid film; heavier lines show average contact line after film retraction during dynamics.

Molecular dynamics simulations of glycerol and glycerol/water films wetting amphiphilic monolayers on graphitic carbon sheets (glycerol film shown in FIG. 8) also support differences in directional wetting based on headgroup. Nanometer-thick glycerol or glycerol/water films on a PCDA monolayer dewet the monolayer essentially independent of the orientation of the rows of headgroups. In FIG. 8, the row of paired headgroups in each model is aligned on the vertical axis near the center of the graphene sheet. After the simulation, the film has contracted along different axes on the two monolayers. White dotted lines show the original extent of the liquid films, while solid white lines guide the eye to the contracted edge of the liquid film. On the diyne PC monolayer (FIG. 8, right panel), the liquid film contracts along the alkyl chains in order to retain contact with charged headgroups. In contrast, on the PCDA monolayer (FIG. 8, left panel), the film contracts in a way that dewets headgroups along the top and bottom ends of the row. Similar behavior in nanometer thick films on diyne PC monolayers is likely important in the directional wetting effects observed in FIG. 7A-7D.

To conclude, we have used the high degree of nanoscale chemical orthogonality intrinsic to biological cell membranes to create directional wetting effects on a layered material on length scales approaching the molecular scale. Unlike lying-down phases of carboxylic acids commonly used to functionalize layered materials, sitting phases of phospholipids have a strongly wettable and protruding headgroup chemistry that produces wetting effects strong enough to persist when the headgroups are confined to 1D assemblies that limit headgroup-specific wetting in lying-down phases. Both phosphoethanolamine and phosphocholine headgroups improve droplet sticking and spreading in comparison with lying-down phases of fatty acids. The headgroup of diyne PC carries a protruding, obligate positive charge on the choline group; monolayers of diyne PC can produce directional wetting along the rows of headgroups. This effect emerges for very thin liquid films (<3 nm) in which a significant fraction of the molecules in the film are near enough to the substrate to experience interactions with charged, protruding headgroups; we note that the film thickness below which we observe these effects is very similar to the length scales at which confinement effects are observed for liquids in other confined geometries such as nanopores. The capability to direct wetting at length scales below 10 nm utilizing a noncovalent ligand chemistry has the potential for broad impacts in applications (e.g. hybrid interfaces for nanoelectronics or optoelectronics) that require designed interfacial structures of two or more materials with significantly different chemical properties.

Experimental Methods

Lipid Monolayer Preparation.

1,2-bis(10,12-tricosa-diynoyl)-sn-glycero-3-phosphocholine (diyne PC) and 1,2-bis(10,12-tricosadiynoyl)-sn-glycero-3-phosphoethanolamine (diyne PE) (>99.0% purity) were purchased from Avanti Lipids (Alabaster, Ala.). 10,12-Pentacosadiynoic acid (≥97% purity) and manganese (II) chloride tetrahydrate (≥98% purity) were purchased from Sigma-Aldrich (St. Louis, Mo.). Sodium chloride (ACS grade) and chloroform (ChromAR grade) were purchased from Macron Fine Chemicals (Center Valley, Pa.). Milli-Q water (≥18.2 MΩ·cm resistivity) was used in all experiments and all chemicals were used as received without further purification. All polymerizable amphiphiles were deposited on 1 cm×1 cm highly oriented pyrolytic graphite (HOPG, SPI Supplies, West Chester, Pa.) substrates. These substrates were freshly cleaved immediately prior to sample deposition. All experiments were carried out under UV-filtered light to prevent polymerization in solution.

Self-assembled monolayers of diacetylene-functionalized phospholipids and fatty acids were prepared via Langmuir-Schaefer (LS) transfer on a KSV-NIMA Langmuir-Blodgett trough (Biolin Scientific, Stockholm, Sweden). LS transfer of phospholipids was carried out by spreading 16 μL of 0.5 mg/mL diyne PE or diyne PC in CHCl$_3$ on a subphase of 5 mM MnCl$_2$ in 18.2 MΩ·cm H$_2$O at 26° C. For PCDA, 12 μL of 0.75 mg/mL PCDA in CHCl$_3$ was deposited on a subphase of 18.2 MΩ·cm H$_2$O. After the small amount of CHCl$_3$ used for amphiphile transfer was allowed to evaporate, trough barriers were swept inward (3 mm/min each barrier, total trough surface area 75 cm$^2$, decreasing by 3 cm$^2$/min) to adjust the surface pressure. When the surface pressure reached the required dipping condition (10 mN/m for diyne PE and diyne PC, 30 Å$^2$/molecule for PCDA), an automated dipper attachment on the LB trough was utilized to lower a freshly cleaved HOPG substrate onto the subphase (dip rate=2 mm/min) with the cleaved surface facing down, nearly parallel (tilt angle 2-3°) to the liquid interface. After 4 min in contact with the liquid interface, the HOPG was gently lifted out of contact with the liquid using the automated dipper. Samples were photopolymerized by irradiating for 1 hr under a 254-nm 8-W UV lamp with approximately 4 cm between the lamp and the sample surface.

AFM Imaging.

All AFM topography images were acquired under ambient conditions using a Veeco MultiMode (Bruker Instruments, Billerica, Mass.) instrument in tapping mode with Bruker MPP silicon probes (P/N RFESP-75, nominal force constant 3 N/m and tip radius <12 nm).

KPFM Imaging.

KPFM measurements were taken with an Asylum Cypher ES (Asylum Research, Santa Barbara, Calif.) under ambient conditions, using Pt-coated probes (MikroMasch, HQ:NSC18/PT, nominal force constant 3 N/m and tip radius <30 nm).

Nanoelectrospray.

Nano scale droplets were produced using a nanoelectrospray assembly consisting of an electrode holder (P/N ESP-M15N, Warner Instruments, Hamden, Conn.) with a platinum wire (diam. 0.127 mm, Sigma-Aldrich, St. Louis, Mo.) inserted into the capillary. Capillaries suitable for nanoscale droplet emission were prepared by pulling borosilicate glass capillaries with 1.5 mm o.d. and 0.86 mm i.d. (Sutter Instruments, Novato, Calif.) using a Sutter Instruments micropipette puller (model P-87). Capillaries were pulled to produce an orifice outer diameter of 4 µm. To induce spraying, a −1.2 kV bias was applied to the Pt electrode, while the Cu counter-electrode was grounded. The working distance between the capillary orifice and HOPG surface was 2 mm. Capillaries were filled with 1% aqueous glycerol in 18.2 MΩ·cm purified water (typical total volume 10 µL) for droplet spraying. Experiments were carried out in a glove box (model 818-GB, Plas Labs, Lansing, Mich.) with humidity control in the range of 50-100%.

Method for Depositing a Liquid on a Monolayer or Thin Film.

Layers of materials on 2D functional templates can be deposited by electrospray, spin-coating, drop-casting, or other methods. In electrospray deposition, for instance, the material (liquid or a molecular or polymeric material dissolved in a liquid) is placed in a capillary with a tip of controlled diameter (typically in the range of micrometers) (Wilhelm, O., et al., *J. Aerosol Science* 2003, 34, 815-836; Juraschek, R., et al., *J. Am. Soc. Mass Spectr.* 1999, 10, 300-308). A metallic wire electrode (typically Pt) is inserted into the capillary, and a bias is applied between the wire and another electrode, in this case a copper plate on which the substrate is placed. As a result of the bias between the wire electrode and the counter-electrode (typically ~1.5 kV here), species in solution, resulting in an aerosol spray emitted from the capillary as the ionic strength of the solution increases. Droplets from the spray are deposited on the substrate. In our experiments, this can result in directional wetting directly, and/or controlled deposition of other materials. In drop-casting, the material of interest (frequently dissolved in a volatile carrier solvent) is deposited on the substrate, and either allowed to dry or the carrier solvent is wicked away after a desired amount of material has been deposited on the surface. In spin-coating, the substrate is mounted on a rotating stage with a rate of rotation that can be controlled. The material of interest is deposited from a syringe at a controlled rate, either before or during substrate rotation, resulting in formation of a controlled thin film.

Molecular Modeling.

Software packages Maestro and Macromodel (Schrödinger, Cambridge, Mass.) were used, respectively, to visualize the structures of phospholipids and fatty acids on graphene and to perform the force field minimizations and molecular dynamics simulations. All models were simulated using the OPLS_2005 force field, with no solvent file and extended cutoffs for van der Waals, electrostatic, and hydrogen-bonding interactions. Minimizations were performed using the Polak-Ribiere conjugate gradient (PRCG) algorithm and gradient method with 50 000 runs and a convergence threshold of 0.05. Most minimizations converged in less than 10 000 runs. For all calculations, atoms in the graphene sheets were frozen, to more closely mimic the structure of HOPG. Thus, while they contributed to the forces present in the system, their positions did not change in response to conformational changes of the adsorbed amphiphiles. For models demonstrating the amphiphile head group height profile, a bilayer of 1680 water molecules was placed on top of the amphiphile monolayers during minimization to more accurately simulate headgroup orientations under hydrated conditions, since the presence of explicit water has been shown previously to impact final minimized geometry in comparison with the use of a solvent force field (Russell, S. R. et al., *Anal. Bioanal. Chem.* 2016, 408, 2649-2658). Simulations of PCDA and diyne PC under glycerol were performed in the same manner, with the exception that the water bilayer was replaced with a glycerol layer comprised of 190 molecules. After minimization, molecular dynamics were run with the SHAKE protocol (bonds to hydrogen), a 1.5 fs step time, 10 ps equilibration time and 1000 ps simulation time with a temperature of 293 K.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A method for preparing a monolayer or a thin film with a patterned nanoscopic wetting surface at a scale of 10 nm or less comprising the steps of:
    a) preparing a polymerizable amphiphile with at least one hydrophobic constituent and one hydrophilic constituent;
    b) preparing a supporting surface;
    c) assembling the polymerizable amphiphile on said supporting surface, wherein said amphiphile adopts a horizontal orientation exposing both hydrophobic and hydrophilic constituents; and
    d) polymerizing the assembled amphiphile to afford a monolayer or thin film with a patterned nanoscopic wetting surface at a scale of 10 nm or less.

2. The method of claim 1, wherein polymerization of said monolayer or thin film of the polymerizable amphiphile is performed by irradiating the assembled polymerizable amphiphile with an UV light.

3. The method of claim 1, wherein said supporting surface comprises graphene, highly oriented pyrolytic graphite (HOPG), $MoS_2$ or $WS_2$.

4. The method of claim 1, wherein said polymerizable amphiphile is a phospholipid.

5. The method of claim 4, wherein said phospholipid is 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE), or an analog thereof.

6. A method for controlling patterned nanoscopic wetting at a scale of 10 nm or less comprising the steps of
   a) preparing a polymerizable amphiphile with at least one hydrophobic constituent and one hydrophilic constituent;
   b) preparing a supporting surface;
   c) assembling the polymerizable amphiphile on said supporting surface, wherein said amphiphile adopts a horizontal orientation exposing both hydrophobic and hydrophilic constituents;
   d) polymerizing the assembled polymerizable amphiphile to afford a monolayer or thin film with a patterned nanoscopic wetting surface; and
   e) depositing a liquid or other material, wherein a controlled patterned nanoscopic wetting at a scale of 10 nm or less is achieved through accessing both hydrophobic and hydrophilic constituents of said monolayer or thin film with a patterned nanoscopic wetting surface.

7. The method of claim 6, wherein polymerization of said amphiphile monolayer or thin film is performed by irradiating the monolayer or thin film with an UV light.

8. The method of claim 6, wherein said liquid or other material comprises an organic or inorganic material.

9. The method of claim 6, wherein said liquid or other material interacts with said amphiphile through covalent or ionic bonding, or through other chemical interactions, creating defined regions of a new surface chemistry.

10. The method of claim 6 wherein said depositing a liquid or other material comprises electrospray, spin-coating, drop-casting, or the like, wherein wetting properties of said liquid or other material on said supporting surface are controlled by head groups, tail groups, or both, of said amphiphile.

11. The method of claim 6, wherein one or more types of amphiphile are used to prepare said monolayer or thin film together with one or more nonpolymerizable amphiphile.

12. The method of claim 6, wherein one or more types of amphiphile are used to prepare said monolayer or thin film together with one or more non-amphiphiles.

13. The method of claim 6, wherein a horizontally-oriented amphiphile is used in combination with an amphiphile oriented non-horizontally.

14. The method of claim 6, wherein said supporting surface is graphene, highly oriented pyrolytic graphite, $MoS_2$ or $WS_2$.

15. The method of claim 6, wherein said amphiphile is a polymerizable phospholipid.

16. The method of claim 15, wherein said polymerizable phospholipid is 1,2-bis(10,12-tricosadiynoyl)-sn-glycero-3-phosphocholine (diyne PC), 1,2-bis(10,12-tricosadiynoyl)-sn-glycero-3-phosphoethanolamine (diyne PE), or an analog thereof.

* * * * *